US011941879B2

(12) United States Patent
Yaroshenko et al.

(10) Patent No.: US 11,941,879 B2
(45) Date of Patent: Mar. 26, 2024

(54) EDGE-BASED PROCESSING OF AGRICULTURAL DATA

(71) Applicant: Mineral Earth Sciences LLC, Mountain View, CA (US)

(72) Inventors: Sergey Yaroshenko, Newark, CA (US); Zhiqiang Yuan, San Jose, CA (US)

(73) Assignee: MINERAL EARTH SCIENCES LLC, Mountain View, CA (US)

( * ) Notice: Subject to any disclaimer, the term of this patent is extended or adjusted under 35 U.S.C. 154(b) by 737 days.

(21) Appl. No.: 17/077,651

(22) Filed: Oct. 22, 2020

(65) Prior Publication Data
US 2022/0129673 A1   Apr. 28, 2022

(51) Int. Cl.
*G06N 20/00*   (2019.01)
*A01B 79/00*   (2006.01)
(Continued)

(52) U.S. Cl.
CPC .......... *G06V 20/188* (2022.01); *A01B 79/005* (2013.01); *G06N 20/00* (2019.01); *G06V 10/25* (2022.01)

(58) Field of Classification Search
CPC .... G06V 20/188; G06V 20/68; G06V 10/454;
G06V 30/18057; G06V 10/82; G06V 10/25; G06V 30/147; G06V 20/56; G06V 20/13; G06V 20/17; A01B 79/005; A01B 69/00; A01B 69/001; G06F 18/00; G06F 17/00; G06T 2207/30181; G06T 2207/20081; G06T 2207/20084; G06Q 50/02; A01D 41/00; G01N 33/0098;
(Continued)

(56) References Cited

U.S. PATENT DOCUMENTS 10,255,670 B1   4/2019   Wu et al.
11,140,813 B1 * 10/2021  Morrison .................. G06T 7/70
(Continued)

OTHER PUBLICATIONS

Pastor et al. "Precision agriculture design method using a distributed computing architecture on internet of things context." Sensors 18.6 (2018): 1731 (Year: 2018).*
(Continued)

*Primary Examiner* — Sumati Lefkowitz
*Assistant Examiner* — Michael Adam Shariff
(74) *Attorney, Agent, or Firm* — Gray Ice Higdon (57) ABSTRACT

Implementations are disclosed for selectively operating edge-based sensors and/or computational resources under circumstances dictated by observation of targeted plant trait(s) to generate targeted agricultural inferences. In various implementations, triage data may be acquired at a first
(Continued)

level of detail from a sensor of an edge computing node carried through an agricultural field. The triage data may be locally processed at the edge using machine learning model(s) to detect targeted plant trait(s) exhibited by plant(s) in the field. Based on the detected plant trait(s), a region of interest (ROI) may be established in the field. Targeted inference data may be acquired at a second, greater level of detail from the sensor while the sensor is carried through the ROI. The targeted inference data may be locally processed at the edge using one or more of the machine learning models to make a targeted inference about plants within the ROI.

21 Claims, 6 Drawing Sheets

(51) Int. Cl.
*G06V 10/25* (2022.01)
*G06V 20/10* (2022.01)

(58) Field of Classification Search
CPC .......... G06N 20/00; G06N 3/02; G06N 3/044; G06N 3/045; G06N 3/0455; G06N 3/0442; G06N 3/0464; G06N 3/04; G06N 20/20; H04L 67/00; H04L 67/01; H04L 67/10; H04L 65/1026; H04W 28/084
See application file for complete search history.

(56) References Cited

U.S. PATENT DOCUMENTS

| 2019/0150357 | A1* | 5/2019 | Wu | H04N 7/188 |
| 2019/0351434 | A1* | 11/2019 | Smith | B05B 12/124 |
| 2020/0327326 | A1* | 10/2020 | Gavish | G06V 10/764 |
| 2021/0278257 | A1* | 9/2021 | Dharia | G06V 20/56 |

OTHER PUBLICATIONS

Merck, Matthew L. et al.; Characterizing the execution of deep neural networks on collaborative robots and edge devices; PEARC; 6 pages; dated 2019.
Grant, Andrew; Edge-based imferemce acceleration; Supply Chain; 6 pages; dated May 28, 2019.
Hadidi, Ramyad et al.; Edge-Tailored Perception Fast Inferencing in-the-Edge with Efficient Model Distribution; pp. 1-16; dated Mar. 13, 2020.
Hadidi, Ramyad et al.; Distributed Perception by Collaborative Robots; IEEE; 8 pages; dated 2018.
Thomas, Anthony et al.; Hierarchical and Distributed Machine Learning Inference Beyond the Edge; IEEE; 6 pages; dated 2019.
Zhou, Zhi et al.; Edge Intelligence: Paving the Last Mile of Artificial Intelligence with Edge Computing; IEEE; 24 bages; dated May 24, 2019.
Ferrandez-Pastor, F. J. et a.; Precision Agriculture Design Method Using a Distributed Computing Architecture on Internet of Things Context; Sensors; pp. 1-21; dated 2018.
Far Eastern Agriculture; Smart Farming with 'AI at the edge'; 2 pages; dated Jun. 28, 2019.

* cited by examiner

ACQUIRE TRIAGE DATA FROM A SENSOR OF AN EDGE COMPUTING DEVICE CARRIED THROUGH AN AGRICULTURAL FIELD BY AGRICULTURAL EQUIPMENT, WHEREIN THE TRIAGE DATA IS ACQUIRED AT A FIRST LEVEL OF DETAIL
502

LOCALLY PROCESS TRIAGE DATA AT EDGE USING MACHINE LEARNING MODEL(S) STORED ON OR EXECUTED BY THE EDGE COMPUTING DEVICE TO DETECT ONE OR MORE TARGETED PLANT TRAITS EXHIBITED BY ONE OR MORE PLANTS IN THE AGRICULTURAL FIELD
504

BASED ON THE DETECTED ONE OR MORE TARGETED PLANT TRAITS, ESTABLISH A REGION OF INTEREST (ROI) IN THE AGRICULTURAL FIELD
506

DOWNLOAD, FROM ONE OR MORE CENTRAL SERVERS THROUGH THE DISTRIBUTED COMPUTING NETWORK, PARAMETERS OF THE MACHINE LEARNING MODEL TO BE USED TO PROCESS TARGETED INFERENCE DATA
508

ACQUIRE TARGETED INFERENCE DATA FROM THE SENSOR AT A SECOND LEVEL OF DETAIL WHILE THE SENSOR OF THE EDGE COMPUTING DEVICE IS CARRIED THROUGH THE ROI OF THE AGRICULTURAL FIELD
510

LOCALLY PROCESS TARGETED INFERENCE DATA AT EDGE USING ONE OR MORE OF THE MACHINE LEARNING MODELS STORED ON OR EXECUTED BY THE EDGE COMPUTING DEVICE TO MAKE A TARGETED INFERENCE ABOUT PLANTS WITHIN THE ROI OF THE AGRICULTURAL FIELD
512

EDGE-BASED PROCESSING OF AGRICULTURAL DATA

BACKGROUND

Various agricultural determinations and/or predictions, such as crop yield predictions, disease/pest diagnosis, plant trait (phenotypic attribute) detection, recommendation crop rotations, etc., can be inferred using machine learning models based on sensor data captured by a variety of different nodes deployed at the "edge" of a distributed computing network. These edge nodes are often deployed, for instance, at or near rural/remote field(s) in which crops are grown. These edge nodes may include robots (land-based or aerial), data processing devices operated/carried by agricultural personnel at or near the edge, and/or sensors deployed on farm equipment, to name a few. Edge nodes may acquire an enormous amount of sensor data (e.g., regional imagery, soil measurements, etc.) that is used to make highly accurate agricultural inferences.

Edge-based computational devices of a distributed computing network are often considered to be "resource-constrained" in that the memory and/or processing capacity of such devices are constrained based upon technological, economic or other reasons, particularly when compared with the virtually limitless resources of centralized computing resources (e.g., "the cloud") of the distributed computing network. Accordingly, the centralized computational resources are often used to perform computationally-intensive agricultural inferences, while the edge nodes are used primarily to gather the sensor data. One result of this paradigm, however, is that there is typically a delay between acquisition of this data at the edge and obtaining agricultural inferences. Network connection(s) between the edge and the centralized computing resources may have limited bandwidth/throughput and/or suffer from low quality of service. Additionally, the amount of data gathered at the edge can be massive, such as gigabytes, terabytes, or even petabytes of data. To address these issues, in some instances, the data is saved to portable memory devices (e.g., portable hard drives) and physically transported from the edge to centralized computing resources of the distributed computing network to process the data, e.g., to generate highly-accurate agricultural inferences. However, this transportation from the edge to the centralized computing resources can take hours or even day(s).

Additional delay is caused by the complexity of the centralized calculations that are performed using the centralized computing resources based on the massive sensor data. For example, generating three-dimensional ("3D") point cloud data from high resolution vision data, e.g., for purposes of predicting yields, counting fruit, etc., is computationally expensive. Moreover, the same plant may be digitally photographed from multiple different angles to ensure that plant parts of economic and/or nutritional interest hidden in one digital image are depicted in another. Various object tracking techniques may be used to track individual plant parts of economic and/or nutritional interest across multiple digital images; however, these techniques also tend to be computationally intensive.

SUMMARY

Implementations are described herein for selectively operating edge-based sensors and/or computational resources, under circumstances dictated by observation of targeted plant trait(s) (e.g., presence of disease, phenotypic attributes, fruit density, etc.), to generate, in real-time or near real-time, targeted agricultural inferences. Generally, an edge-based computational resource is any data processing device that is able to receive sensor data from edge-based sensors at or near real-time over a local area network (LAN), a personal area network (PAN), or one or more busses. Accordingly, edge-based sensors and/or computational resources may include, for instance, sensor(s) and/or computational resources integral with robot(s) deployed at the edge, computing system(s) deployed at the edge (e.g., local servers, workstations, laptop computers, tablet computers), and/or Internet-of-things ("IoT") devices deployed at the edge.

In some implementations, real-time (or near real-time) agricultural inferences may be made at the edge by applying various data as input across machine learning model(s). These machine learning models may take various forms, such as various types of neural networks, including but not limited to a convolutional neural network ("CNN"), a recurrent neural network ("RNN"), a long short-term memory ("LSTM") network, a gated recurrent unit ("GRU") network, a transformer neural network, and so forth. Additionally or alternatively, in some implementations, other types of models may be employed, including but not limited to support vector machines, random forests, decision trees, and so forth.

In some implementations, machine learning model(s) may be obtained as needed/on demand based on the circumstances dictated by the detection of targeted plant trait(s). For example, one machine learning model already available at the edge, which may be referred to herein as a "triage" machine learning model, may be used to process sensor data generated by edge-based sensor(s) to detect targeted plant trait(s). In some implementations, this processed sensor data may be referred to as "triage" data because it is used to detect targeted plant trait(s) that, when detected, trigger performance of more extensive computation and/or sampling for a particular purpose associated with detection of targeted plant trait(s).

In some implementations, the triage data may be acquired at a level of detail (e.g., frequency, resolution, framerate, etc.) that is selected to conserve edge-based computational resources so that, for instance, other stream(s) of sensor data may be triaged or screened for other targeted plant trait(s). In some implementations, the sensor itself may be operated at a frequency below the sensor's operational capabilities, and the below-operational-capability sensor data it generates may be processed as triage data. In other implementations, the sensor may be operated at or near its normal or maximum operational frequency, and the triage data may be sampled from the sensor data at a lesser frequency. In yet other implementations, particularly where the sensor is a vision sensor such as an RGB camera, the vision sensor may be operated to obtain, as triage data, digital images at a lower resolution and/or framerate than the vision sensor is otherwise capable of capturing.

In some implementations, upon detection of one or more targeted plant traits, one or more additional machine learning models, which may be referred to herein as targeted inference machine learning models, may be selected and/or downloaded from a centralized repository of machine learning models. As used herein to describe a machine learning model, "targeted inference" may refer to the model being more complex and/or requiring more computing resources to process than, for instance, a triage machine learning model. For example, a triage machine learning model may be usable to process lower-detail triage data whereas an targeted inference machine learning model may be usable to process more comprehensive (e.g., more detailed) data that will be referred to herein as "targeted inference data." In other implementations, the triage and targeted inference machine learning models may be the same—the difference may be in the level of detail in the data that is processed using the model during triage versus during targeted inference.

Upon detection of targeted plant trait(s) in the triage data using the triage machine learning model(s), in various implementations, a region of interest (ROI) may be established (e.g., defined as a geofence or geographically-bound space) in the agricultural field. This ROI may be defined based on the assumption that there is heightened interest—triggered by the detected targeted plant trait(s)—in plant(s) contained within the ROI. For example, suppose the targeted plant trait is presence of a plant disease. Detection of plant disease on one or more plant(s) based on the triage data may increase a likelihood that the plant disease is also present on other nearby plants. Accordingly, the ROI may be established as an area of a field that will be sensed by the sensor next (e.g., in front of an agricultural vehicle or robot). In some implementations, the ROI is established as an area traveled by the sensor until the targeted plant trait(s) are no longer detected, at which point the ROI ends. For example, an ROI may begin where a first diseased plant or a first threshold number/density of diseased plants are detected and may end subsequently where a first healthy plant or a first threshold number/density of healthy plants are detected.

Once it is determined (e.g., using position coordinates, inertial measurement units (IMUs), wireless signal triangulation, etc.) that the sensor or another sensor is being carried through the ROI, targeted inference data that has a greater level of detail than the triage data may be acquired from the sensor. As noted above, to increase the level of detail, the sensor itself may be operated to generate more detailed data (e.g., operated at a higher frequency and/or to acquire data at a higher resolution), or the same sensor data may be sampled at a greater rate.

Whichever the case, the targeted inference data may be processed at the edge using one or more of the aforementioned targeted inference machine learning models to make targeted inference(s) about plants within the ROI of the agricultural field. In some implementations, this targeted inference may be extrapolated beyond the ROI, e.g., to the entire field and/or to a portion of the field that shares various characteristics with the ROI (e.g., used to grow the same type of crop). Therefore, in various implementations, more complex machine learning model calculations may be performed at the edge in response to targeted plant trait(s) being detected, and may be applied selectively across targeted inference data captured while a sensor is carried through an ROI established in response to detection of the targeted plant trait(s).

In some implementations, a method may be implemented using one or more resource-constrained edge processors at an edge of a distributed computing network that are remote from one or more central servers of the distributed computing network. The method may include: acquiring triage data from a sensor of an edge computing node carried through an agricultural field by agricultural equipment, wherein the triage data is acquired at a first level of detail; locally processing the triage data at the edge using one or more machine learning models stored on or executed by the edge computing node to detect one or more targeted plant traits exhibited by one or more plants in the agricultural field; based on the detected one or more targeted plant traits, establishing a region of interest (ROI) in the agricultural field; acquiring targeted inference data from the sensor at a second level of detail while the sensor of the edge computing node is carried through the ROI of the agricultural field, wherein the second level of detail is greater than the first level of detail; and locally processing the targeted inference data at the edge using one or more of the machine learning models stored on or executed by the edge computing node to make a targeted inference about plants within the ROI of the agricultural field.

In various implementations, the sensor operates at a first frequency, and acquiring the triage data at the first level of detail comprises sampling sensor output of the sensor at a second frequency that is less than the first frequency. In various implementations, the sensor comprises a vision sensor, the first level of detail comprises a first framerate, and the second level of detail comprises a second framerate that is greater than the first framerate. In various implementations, the sensor comprises a vision sensor, the first level of detail comprises a first resolution, and the second level of detail comprises a second resolution that is greater than the first resolution.

In various implementations, the method further includes downloading, from one or more of the central servers through the distributed computing network, parameters of the machine learning model used to process the targeted inference data, wherein the parameters are selected from a library of machine learning model parameters based on the detected one or more targeted plant traits. In various implementations, the same machine learning model is used to process the triage data and the targeted inference data.

In various implementations, the machine learning model used to process the triage data is a triage machine learning model, the machine learning model used to process the targeted inference data is an targeted inference machine learning model, and processing the triage data using the triage machine learning model utilizes less computing resources than processing the targeted inference data using the targeted inference machine learning model. In various implementations, the agricultural equipment comprises an autonomous robot that is equipped with the sensor.

In various implementations, the agricultural equipment comprises a farming vehicle, and the sensor is mounted on a boom of the farming vehicle. In various implementations, the sensor is integral with a modular computing device that is removably mounted on the boom, wherein the modular computing device is equipped with one or more of the edge processors.

In various implementations, the method further includes acquiring additional targeted inference data from an additional sensor at a third level of detail while the additional sensor is carried through the ROI of the agricultural field. In various implementations, the detected one or more targeted plant traits comprise one or more of: a plant type; one or more heights of one or more plants; a density of a plurality of plants; presence of a plant disease or malady; a color of one or more plants; presence of one or more fruits or flowers on one or more plants; or one or more sizes of one or more fruits or flowers on one or more plants.

In addition, some implementations include one or more processors (e.g., central processing unit(s) (CPU(s)), graphics processing unit(s) (GPU(s)), and/or tensor processing unit(s) (TPU(s))) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Yet other implementations include agricultural vehicles, such as robots, that are equipped with edge processor(s) configured to carry out selected aspects of the present disclosure.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
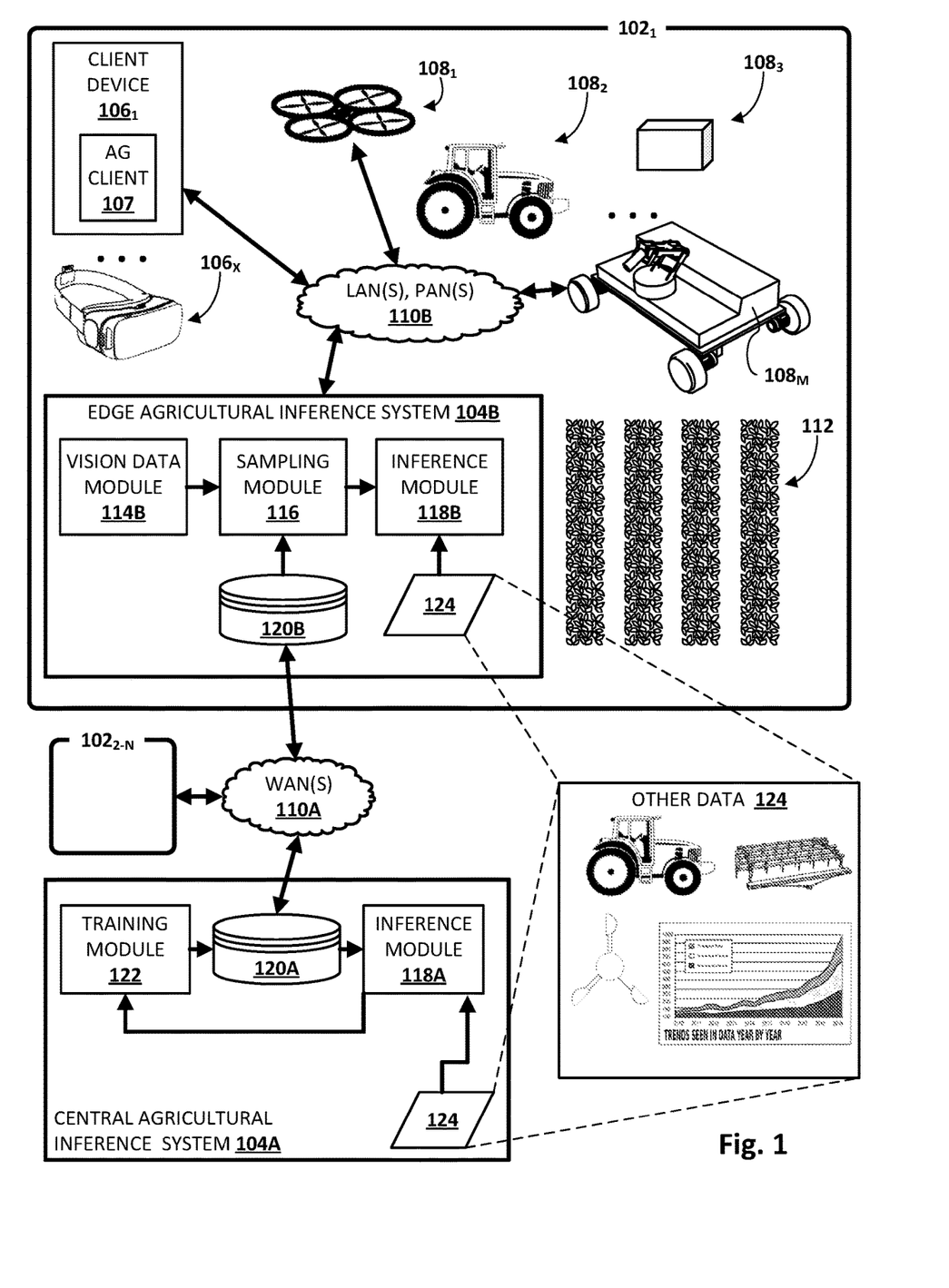
FIG. 1 schematically depicts an example environment in which disclosed techniques may be employed in accordance with various implementations.

FIG. 1 schematically illustrates an environment in which one or more selected aspects of the present disclosure may be implemented, in accordance with various implementations. The example environment includes a plurality of edge sites $102_{1-N}$ (e.g., farms, fields, plots, or other areas in which crops are grown) and a central agricultural inference system 104A. Additionally, one or more of the edge sites 102, including at least edge site $102_1$, includes an edge agricultural inference system 104B, a plurality of client devices $106_{1-X}$, human-controlled and/or autonomous farm equipment $108_{1-M}$, and one or more fields 112 that are used to grow one or more crops. Field(s) 112 may be used to grow various types of crops that may produce plant parts of economic and/or nutritional interest. These crops may include but are not limited to everbearing crops such as strawberries, tomato plants, or any other everbearing or non-everbearing crops, such as soy beans, corn, lettuce, spinach, beans, cherries, nuts, cereal grains, berries, grapes, and so forth.

One edge site $102_1$ is depicted in detail in FIG. 1 for illustrative purposes. However, as demonstrated by additional edge sites $102_{2-N}$, there may be any number of edge sites 102 corresponding to any number of farms, fields, or other areas in which crops are grown, and for which agricultural inferences such as crop yield predictions may be of interest. Each edge site 102 may include the same or similar components as those depicted in FIG. 1 as part of edge site $102_1$.

In various implementations, components of edge sites $102_{1-N}$ and central agricultural inference system 104A collectively form a distributed computing network in which edge nodes (e.g., client device 106, edge agricultural inference system 104B, farm equipment 108) are in network communication with central agricultural inference system 104A via one or more networks, such as one or more wide area networks ("WANs") 110A. Components within edge site $102_1$, by contrast, may be relatively close to each other (e.g., part of the same farm or plurality of fields in a general area), and may be in communication with each other via one or more local area networks ("LANs", e.g., Wi-Fi, Ethernet, various mesh networks) and/or personal area networks ("PANs", e.g., Bluetooth), indicated generally at 110B.

An individual (which in the current context may also be referred to as a "user") may operate a client device 106 to interact with other components depicted in FIG. 1. Each client device 106 may be, for example, a desktop computing device, a laptop computing device, a tablet computing device, a mobile phone computing device, a computing device of a vehicle of the participant (e.g., an in-vehicle communications system, an in-vehicle entertainment system, an in-vehicle navigation system), a standalone interactive speaker (with or without a display), or a wearable apparatus that includes a computing device, such as a head-mounted display ("HMD") that provides an AR or VR immersive computing experience, a "smart" watch, and so forth. Additional and/or alternative client devices may be provided.

Central agricultural inference system 104A and edge agricultural inference system 104B (collectively referred to herein as "agricultural inference system 104") comprise an example of a distributed computing network in which the techniques described herein may be implemented. Each of client devices 106, agricultural inference system 104, and/or farm equipment 108 may include one or more memories for storage of data and software applications, one or more processors for accessing data and executing applications, and other components that facilitate communication over a network. The computational operations performed by client device 106, farm equipment 108, and/or agricultural inference system 104 may be distributed across multiple computer systems.

Each client device 106 (and in some implementation, some farm equipment 108), may operate a variety of different applications that may be used, for instance, to obtain and/or analyze various agricultural inferences (real time and delayed) that were generated using techniques described herein. For example, a first client device $106_1$ operates agricultural ("AG") client 107 (e.g., which may be standalone or part of another application, such as part of a web browser). Another client device $106_X$ may take the form of a HMD that is configured to render 2D and/or 3D data to a wearer as part of a VR immersive computing experience. For example, the wearer of client device $106_X$ may be presented with 3D point clouds representing various aspects of objects of interest, such as fruits of crops, weeds, crop yield predictions, etc. The wearer may interact with the presented data, e.g., using HMD input techniques such as gaze directions, blinks, etc.

Individual pieces of farm equipment $108_{1-M}$ may take various forms. Some farm equipment 108 may be operated at least partially autonomously, and may include, for instance, an unmanned aerial vehicle $108_1$ that captures sensor data such as digital images from overhead field(s) 112. Other autonomous farm equipment (e.g., robots) may include a robot (not depicted) that is propelled along a wire, track, rail or other similar component that passes over and/or between crops, a wheeled robot $108_M$, or any other form of robot capable of being propelled or propelling itself past crops of interest. In some implementations, different autonomous farm equipment may have different roles, e.g., depending on their capabilities. For example, in some implementations, one or more robots may be designed to capture data, other robots may be designed to manipulate plants or perform physical agricultural tasks, and/or other robots may do both. Other farm equipment, such as a tractor $108_2$, may be autonomous, semi-autonomous, and/or human-driven. Any of farm equipment 108 may include various types of sensors, such as vision sensors (e.g., 2D digital cameras, 3D cameras, 2.5D cameras, infrared cameras), inertial measurement unit ("IMU") sensors, Global Positioning System ("GPS") sensors, X-ray sensors, moisture sensors, barometers (for local weather information), photodiodes (e.g., for sunlight), thermometers, etc.

Figure 2:
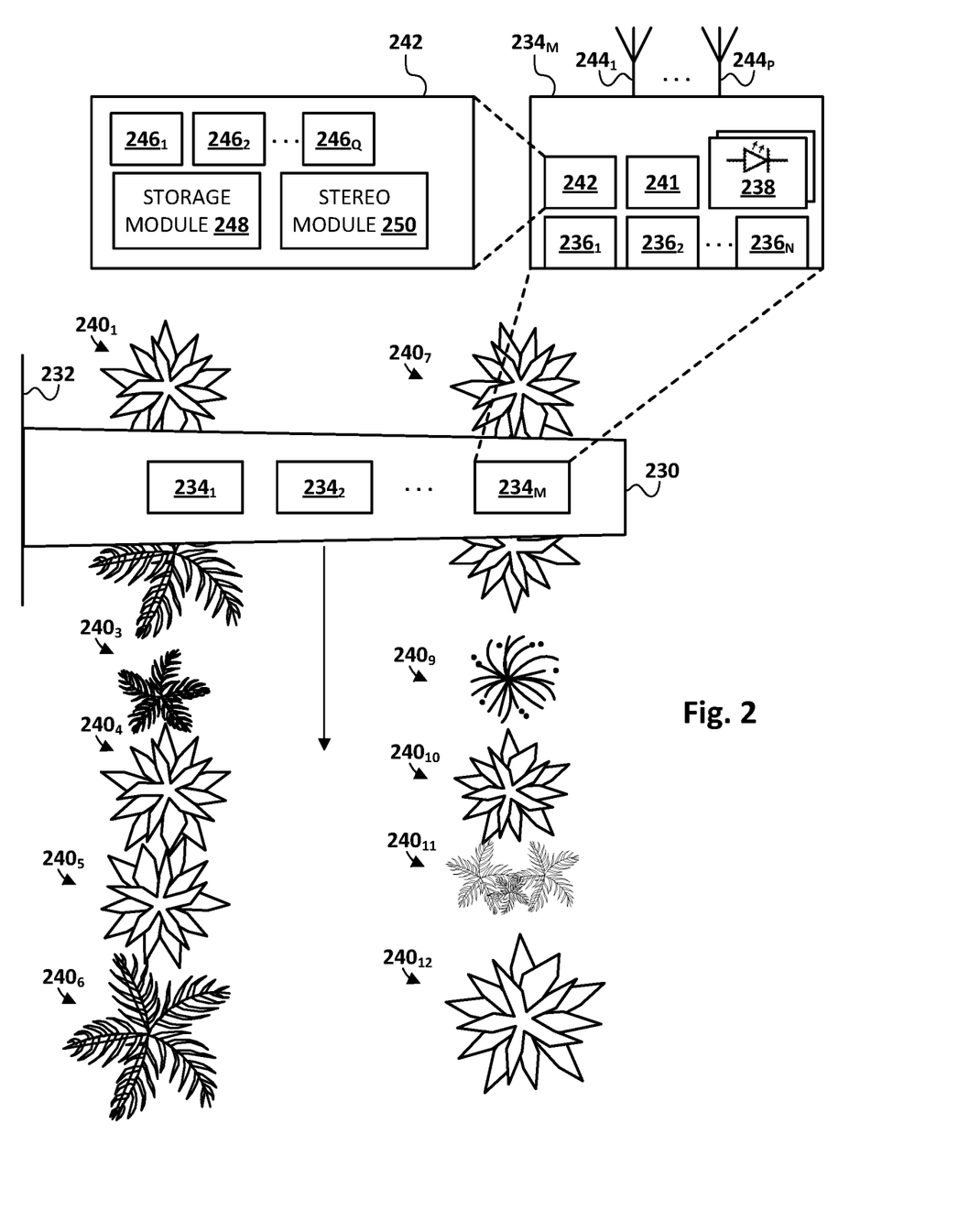
FIG. 2 depicts an example of how edge computing nodes configured with selected aspects of the present disclosure may be deployed in a field.

In some implementations, farm equipment 108 may take the form of one or more edge computing nodes $108_3$. An edge computing node $108_3$ may be a modular and/or portable data processing device that, for instance, may be carried through an agricultural field 112, e.g., by being mounted on another piece of farm equipment (e.g., on a boom affixed to tractor $108_2$ or to a truck) that is driven through field 112 and/or by being carried by agricultural personnel. Edge computing node $108_3$ may include logic such as processor(s), application-specific integrated circuits (ASICs), field-programmable gate arrays (FPGA), etc., configured with selected aspects of the present disclosure to capture and/or process various types of sensor data to make agricultural inferences. FIG. 2 schematically depicts one example of an edge computing node 234, and will be discussed in more detail shortly.

In some examples, one or more of the components depicted as part of edge agricultural inference system 104B may be implemented in whole or in part on a single edge computing node $108_3$, across multiple edge computing nodes $108_3$, and/or across other computing devices, such as client device(s) 106. Thus, when operations are described herein as being performed by/at edge agricultural inference system 104B, it should be understood that those operations may be performed by one or more edge computing nodes $108_3$, and/or may be performed by one or more other computing devices at the edge 102, such as on client device(s) 106.

In various implementations, edge agricultural inference system 104B may include a vision data module 114B, a sampling module 116, and an edge inference module 118B. Edge agricultural inference system 104B may also include one or more edge databases 120B for storing various data used by and/or generated by modules 114B, 116, and 118B, such as vision and/or other sensor data gathered by farm equipment $108_{1-M}$, agricultural inferences, machine learning models that are applied and/or trained using techniques described herein to generate agricultural inferences, and so forth. In some implementations one or more of modules 114B, 116, and/or 118B may be omitted, combined, and/or implemented in a component that is separate from edge agricultural inference system 104B.

In various implementations, central agricultural inference system 104A may be implemented across one or more computing systems that may be referred to as the "cloud." Central agricultural inference system 104A may receive the massive sensor data generated by farm equipment $108_{1-M}$ (and/or farm equipment at other edge sites $102_{2-N}$) and process it using various techniques to make agricultural inferences. However, as noted previously, the agricultural inferences generated by central agricultural inference system 104A may be delayed (and are referred to herein as "delayed crop agricultural inferences"), e.g., by the time required to physically transport portable data devices (e.g., hard drives) from edge sites $102_{1-N}$ to central agricultural inference system 104A, and/or by the time required by central agricultural inference system 104A to computationally process this massive data.

Agricultural personnel (e.g., farmers) at edge sites 102 may desire agricultural inferences much more quickly than this. However, and as noted previously, computing resources at edge agricultural inference system 104B (including edge computing node(s) $108_3$) may be limited, especially in comparison to those of central agricultural inference system 104A. Accordingly, edge agricultural inference system 104B at edge site $102_1$ may be configured to generate "triage" agricultural inferences based on relatively low-detail sensor data (referred to herein as "triage data") gathered by farm equipment $108_{1-M}$. Other edge sites may be similarly equipped to make triage agricultural inferences based on triage data. While these triage agricultural inferences themselves may or may not be sufficiently accurate to cause agricultural personnel to alter agricultural behavior, the triage inferences can nonetheless be leveraged to pursue, at the edge, "targeted agricultural inferences." These targeted agricultural inferences may or may not be as accurate as the delayed agricultural inferences generated by central agricultural inference system 104A. But even if the targeted agricultural inferences are somewhat less accurate, this loss of accuracy may be acceptable to farmers who need to be able to generate agricultural inferences in a timely manner.

The delayed agricultural inferences made by central agricultural inference system 104A may be used for a variety of purposes, not the least of which is to train the machine learning models used by edge inference module 118B to generate triage and/or targeted agricultural inferences. For example, central agricultural inference system 104A may include a training module 122, a central inference module 118A (which may share some characteristics with edge inference module 118B), and a central database 120A that stores one or more machine learning models. Central agricultural inference system 104A in general, and training module 122 and/or central inference module 118A in particular, may be configured to train those machine learning models (before and/or throughout their deployment) to generate triage and/or targeted agricultural inferences. To perform this training, training module and central inference module 118A may utilize sensor data generated by farm equipment $108_{1-M}$, e.g., alone and/or in concert with other data 124.

In various implementations, edge agricultural inference system 104B is able to generate triage agricultural inference in real time or near real time because edge inference module 118B selectively processes less than all the massive sensor data generated by farm equipment $108_{1-M}$. In other words, the triage data has a level of detail that is lower than, for instance, level(s) of detail the sensor(s) are capable of generating or that the sensor(s) actually generate. For example, in some implementations, sampling module 116 may be configured to sample, e.g., from one or more sensors onboard one or more farm equipment $108_{1-M}$, triage data at a frequency that is lower than the data actually generated by those sensor(s). Alternatively, the sensors themselves may be operated at lower frequencies than they are capable while obtaining triage data. Levels of detail of sensor data are not limited to temporal frequencies (or temporal resolutions). For example, with digital imagery, levels of detail may include, in addition to framerate (i.e. temporal frequency), spatial resolution (e.g., how many pixels are included the images), and/or spectral resolution (e.g., how many different color bands are represented by each pixel).

Whichever the case, the triage data may be applied, e.g., continuously and/or periodically by edge inference module 118B, as input across one or more machine learning models stored in edge database 120B to generate output indicative of one or more targeted plant traits detected in/on one or more plants in the agricultural field 112. Based on the detected one or more targeted plant traits, edge agricultural inference system 104B may establish a region of interest (ROI) in agricultural field 112. Then, while the same sensor(s) or different sensor(s) are carried (e.g., by farm equipment 108) through the ROI of the agricultural field, sampling module 116 may obtain targeted inference data from the sensor(s) at a greater level(s) of detail than the triage data. For example, targeted inference data may have greater temporal, spatial, and/or spectral resolution than triage data.

Edge agricultural inference system 104B may process the targeted inference data at the edge using one or more of the machine learning models stored in database 120B. In some cases, one or more of these machine learning model(s) may be stored and/or applied directly on farm equipment 108, such as edge computing node $108_3$, to make a targeted inference about plants within the ROI of the agricultural field. Thus, edge agricultural inference system 104B is only making selected targeted agricultural inferences—e.g., in response to detection of one or more targeted plant traits—in ROIs of agricultural field 112 (as opposed to across its entirety). Consequently, in spite of the relatively constrained computing resources available at edge $102_1$, edge agricultural inference system 104B is able to generate "good enough" agricultural inferences in real time or near real time.

In some implementations, edge agricultural inference system 104B may selectively (e.g., on an "as needed" basis) download and/or install trained models that are stored in database 120A of central agricultural inference system 104A. For example, if edge inference module 118B determined based on processing of triage data, that a particular plaint trait is detected, edge agricultural inference system 104B may download new machine learning model(s) that are trained to make inferences related to those detected plant traits. As one example, inference module 118B may apply a triage machine learning model to triage data to detect, generically, the presence of plant disease, without detecting which specific plant disease(s) are present. Then, inference module 118B may request and/or download, from central agricultural inference system 104A, one or more machine learning models that are trained to detect specific types of plant disease. Inference module 118B may then apply these newly-obtained model(s) to highly-detailed target inference data to determine which specific plant diseases are present. Then it is possible for agricultural personnel to practice more finely-targeted remedial measures.

In contrast to edge agricultural inference system 104B, central inference module 118A may have the virtually limitless resources of the cloud at its disposal. Accordingly, central inference module 118A may apply all of the sensor data generated by farm equipment $108_{1-M}$ (e.g., a superset of high resolution digital images acquired during a given time interval) as input across machine learning model(s) stored in central database 120A to generate the delayed agricultural inferences described previously. And in some implementations, training module 122 may train the machine learning model(s) stored in database 120A based on a comparison of these delayed agricultural inferences to ground truth data (e.g., realized crop yields, human-observed disease or blight). Based on such a comparison, training module 122 may employ techniques such as back propagation and/or gradient descent to update the machine learning model(s) stored in central database 120A. The updated machine learning model(s) may subsequently be used by both edge inference module 118B and central inference module 118A to generate, respectively, real time and delayed agricultural inferences.

In some implementations, edge agricultural inference system 104B may employ techniques other than (or in addition to) obtaining sensor data at various levels of detail (e.g., triage and targeted inference) in order to generate real time crop yield predictions more quickly and/or accurately. For example, one or more components of edge agricultural inference system 104B such as vision data module 114B and/or edge inference module 118B may process a subset of high spatial/temporal/spectral resolution data sampled by sampling module 116 to generate one or more image embeddings (or vectors). In some such implementations, this processing may include applying the subset of high resolution digital images as input across at least a portion of a machine learning module such as a CNN to generate the image embeddings/vectors. Using image embeddings may be more efficient than, for instance, counting individual crops, which may require 3D reconstruction from a point cloud, object tracking, etc. With image embeddings, it is possible to estimate the density of plant parts of interest (e.g., strawberries), rather than counting individual plant parts of interest. Density of plant parts of interest may be measured per plant, per meter, etc.

As noted previously, various types of machine learning models may be applied by inference modules 118A/B to generate crop yield predictions (real time and delayed). Additionally, various types of machine learning models may be used to generate image embeddings that are applied as input across the various machine learning models. These various models may include, but are not limited to, RNNs, LSTM networks (including bidirectional), transformer networks, feed-forward neural networks, CNNs, support vector machines, random forests, decision trees, etc.

Additionally, other data 124 may be applied as input across these models besides sensor data or embeddings generated therefrom. Other data 124 may include, but is not limited to, historical data, weather data (obtained from sources other than local weather sensors), data about chemicals and/or nutrients applied to crops and/or soil, pest data, crop cycle data, previous crop yields, farming techniques employed, and so forth. Weather data may be obtained from various sources other than sensor(s) of farm equipment 108, such as regional/county weather stations, etc. In implementations in which local weather and/or local weather sensors are not available, weather data may be extrapolated from other areas for which weather data is available, and which are known to experience similar weather patterns (e.g., from the next county, neighboring farms, neighboring fields, etc.).

In this specification, the term "database" and "index" will be used broadly to refer to any collection of data. The data of the database and/or the index does not need to be structured in any particular way and it can be stored on storage devices in one or more geographic locations. Thus, for example, database(s) 120A and 120B may include multiple collections of data, each of which may be organized and accessed differently.

FIG. 2 depicts an example field of plants $240_{1-12}$. A boom 230 mounted to a vehicle 232 (mostly not visible in FIG. 2, e.g., a tractor, a robot, a truck, etc.) is being carried over plants $240_{1-12}$ as shown by the arrow to gather sensor data. Boom 230 may include, for instance, sprinklers for irrigation, sprayers for chemical application, etc. Also mounted on boom 230 are a plurality of edge computing nodes $234_{1-M}$ (which may share characteristics with edge computing node $108_3$ in FIG. 1) that are configured with selected aspects of the present disclosure. Although shown as boxes on top of boom 230 in FIG. 2, edge computing nodes $234_{1-M}$ may alternatively be mounted at other locations of boom 230, such as on its sides or bottom. And while multiple edge computing nodes $234_{1-M}$ are depicted in FIG. 2, any number of edge computing nodes 234, such as a single edge computing node 234, may be deployed in similar fashions.

As shown by the called-out window at top right, edge computing node $234_M$ includes one or more sensors in the form of vision sensors $236_{1-N}$, one or more lights 238, a light controller 241, and logic 242 that is configured to carry out selected aspects of the present disclosure. Other edge computing nodes may or may not be similarly configured. Vision sensors $236_{1-N}$ may various forms, and may or may not be the same as each other. These forms may include, for instance, an RGB digital camera, an infrared camera, a 2.5D camera, a 3D camera, and so forth. In some implementations, one or more or more of vision sensors $236_{1-N}$ may take the form of a 2D camera with an RGB and/or mono resolution of, for instance, 2590 px×2048 px or greater. One or more of these 2D vision sensors $236_{1-N}$ may capture images at various framerates (frames per second, or "FPS"), such as 30 FPS. In some implementations in which one or more of vision sensors $236_{1-N}$ captures 2.5D or 3D data, a point cloud having a resolution of, for instance, 640 px×480 px and/or a framerate of 10 FPS or greater may be implemented. In some implementations, vision sensor(s) 236 may capture 2D data and then generate 3D data (e.g., point clouds) using techniques such as structure from motion (SFM).

Light(s) 238 and light controller 241 may be configured to illuminate plants 240, e.g., in synch with operation of vision sensors $236_{1-N}$, in order to insure that the vision data that is captured is illuminated sufficiently so that it can be used to make accurate agricultural inferences (whether triage or targeted inferences). Light(s) 238 may take various forms, such as the light emitting diode (LED) depicted in FIG. 2, halogen lamps, incandescent lamps, etc. In various implementations, light(s) 238 may be operated, e.g., by light controller 241, to emit various amounts and/or strengths of light (or more generally, electromagnetic radiation). For example, in some implementations, light(s) 238 may emit 14,000 lux of luminance or greater. In some such implementations, light controller 241 may also trigger vision sensors $236_{1-N}$ to acquire image data in synch with activation of light(s) 238.

Edge computing node $234_M$ also includes one or more wireless antenna $244_{1-P}$. In some implementations, each wireless antenna 244 may be configured to transmit and/or receive different types of wireless data. For example, a first antenna $244_1$ may be configured to transmit and/or receive Global Navigation Satellite System (GNSS) wireless data, e.g., for purposes such as localization and/or ROI establishment. Another antenna $244_P$ may be configured to transmit and/or receive IEEE 802.12 family of protocols (Wi-Fi) or Long-Term Evolution (LTE) data. Another antenna 244 may be configured to transmit and/or receive 5G data. Any number of antennas 244 may be provided to accommodate any number of wireless technologies.

In some implementations, an edge computing node 234 may be capable of localizing itself within agricultural field 112 using various technologies. For example, the GNSS antenna $244_1$ may interact with satellite(s) to obtain a position coordinate. Additionally or alternatively, edge computing node 234 may use techniques such as inertial measurement units (IMU) that are generated by, for instance, sensor(s) integral with wheels (not depicted) of vehicle 232, accelerometer(s), gyroscope(s), magnetometer(s), etc. In yet other implementations, wireless triangulation may be employed. In some implementations, edge computing node 234 may be capable of localizing itself with an accuracy of 20 cm or less, e.g., at a frequency of 10 Hz or greater (or an IMU frequency of 100 Hz or greater).

Logic 242 may include various types of circuitry (e.g., processor(s), FPGA, ASIC) that is configured to carry out selected aspects of the present disclosure. For example, and as shown in the called-out window at top left in FIG. 2, logic 242 may include any number of tensor processing units (TPU) $246_{1-Q}$, a storage module 248, and a stereo module 250 (one or more graphical process units (GPU) and/or central processing units (CPU) may also be present, even if not depicted). In some implementations, four TPUs $246_{1-4}$ may be employed to process sensor data, e.g., in parallel, using four different machine learning models, e.g., at an inference framerate per model of 20 FPS or greater.

Other configurations are possible. For example, instead of some number of TPUs, in some examples, an edge computing node 234 may include some number of GPUs, each with some number of cores. With the example operational parameters of edge computing node 234 described herein, in some examples, edge computing node 234 may be capable of being moved (or moving itself) at various speeds to perform its tasks, such as up to 12 m/s.

Storage module 248 may be configured to acquire and store, e.g., in various types of memories onboard edge computing node 234, sensor data acquired from one or more sensors (e.g., vision sensors $236_{1-N}$). In order to accommodate sensor input streams of, for instance, 1 GB/s, storage module 248 may, in some cases, initially write sensor data to a dedicated logical partition on a Non-Volatile Memory Express (NVMe) drive. Subsequently, e.g., after processing by inference module 118B, the sampled data may be copied to a Redundant Array of Inexpensive Disks (RAID) solid state drive for long-term storage. Stereo module 250 may be provided in some implementations in order to reconcile images captured by 2D vision sensors that are slightly offset from each other, and/or to generate 3D images and/or images with depth.

Figure 3:
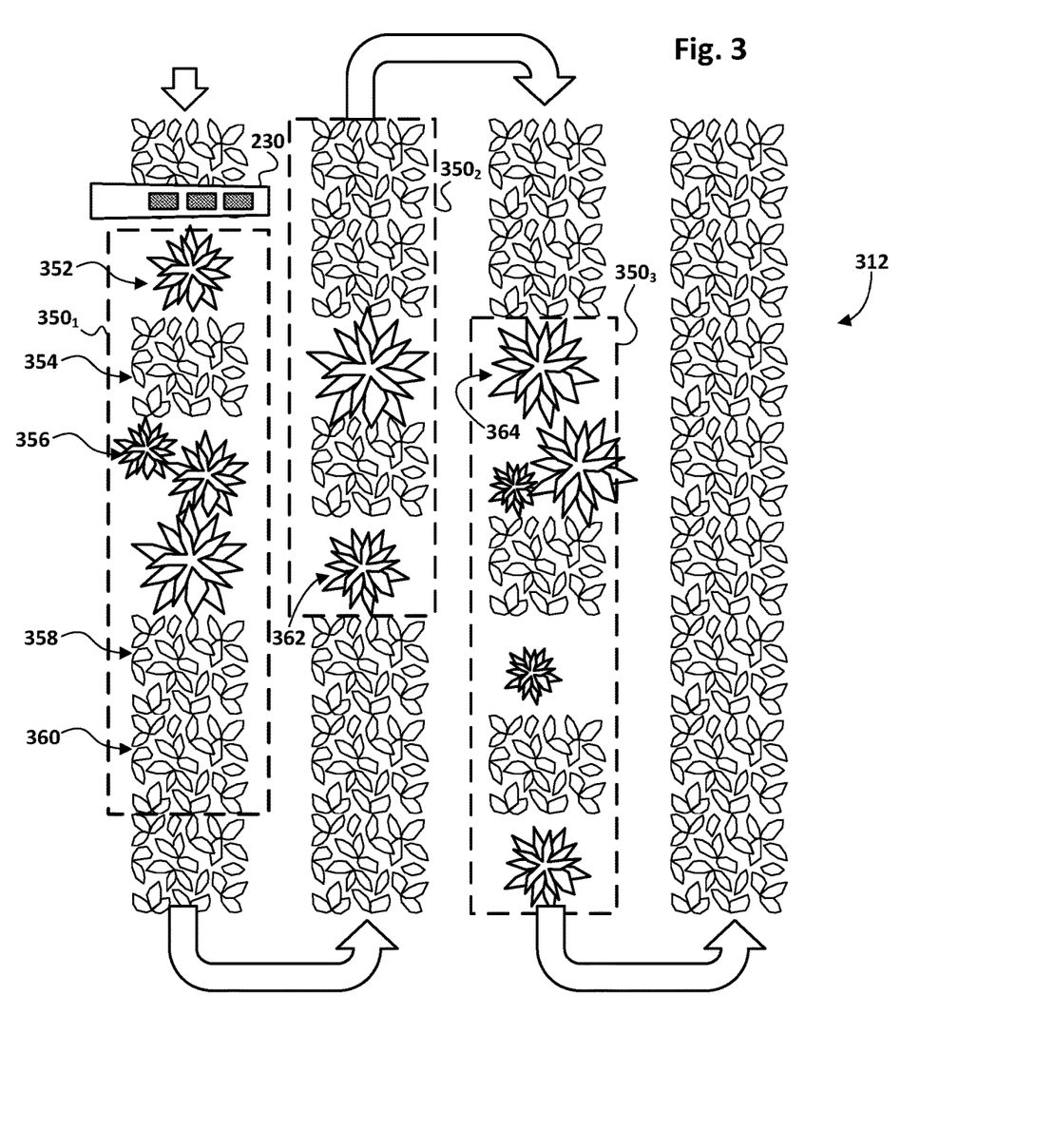
FIG. 3 schematically depicts one example of how ROIs may be established in a field.

FIG. 3 demonstrates an example of how ROIs may be established in a particular field 312 based on detection of targeted plant traits. FIG. 3 also demonstrates how these ROIs may be used to determine when triage data (e.g., relatively low level of detail) is obtained/processed versus when targeted inference data (e.g., relatively high level of detail) is obtained/processed. Starting at top left, boom 230 (with three edge computing nodes onboard as indicated by the shaded rectangles) may be carried through field 312 along the trajectory shown by the arrows. Thus, boom 230 is first carried over the leftmost row from top to bottom, then is turned around and carried over the second row from bottom to top. Boom 230 is then turned around again and carried down over the third row, and once again is turned around and brought up over the fourth (right-most row). To accomplish this, the farm vehicle (not depicted) to which boom 230 is attached may be traversed between the various rows.

An ROI is established in the example of FIG. 3 when plants other than a desired plant are detected. For example, if a particular crop is being grown intentionally in field 312, then plants other than that crop may not be desired, and may be classified as weeds in that context. Thus, one plant trait that is searched for in triage data available to the edge computing nodes on boom 230 is a plant type. This type of plant trait can be detected visually, e.g., using one or more machine learning models, such as a CNN, to perform object recognition.

In FIG. 3, a weed 352 is detected in triage data soon after boom 230 is carried down over the left-most row. Upon detection of weed 352, one or more of the edge computing nodes on boom 230 may establish a first ROI $350_1$. First ROI $350_1$ may be defined as the area underneath boom 230 as it is carried until some exit condition is satisfied. Once the exit condition is satisfied, first ROI $350_1$ may be closed or "tied off." While boom 230 is carried over first ROI $350_1$ (and through any other ROI described herein), the edge computing nodes may be operated to obtain and/or process targeted inference data at a relatively high level of detail, rather than triage data at a relatively low level of detail. Additionally or alternatively, other sensors may be selectively activated and/or operated, whether they are also affixed to boom 230 or are carried through field 312 at a later time.

Exit conditions may take various forms and may be configured, for instance, by agricultural personnel. In the example of FIG. 3, the exit condition is detection of two or more consecutive instances of a desired plant type. Thus, when only a single instance 354 of the desired plant type is detected before another weed 356 is detected, the first ROI $350_1$ is not yet closed. First ROI $350_1$ in fact isn't closed until two consecutive instances 358-360 of the desired plant type are detected.

Boom 230 is then carried over the second-from-left row, upward along the page. In this row, a second ROI $350_2$ is established upon detection of weed 362. Second ROI $350_2$ may be tied off when either two consecutive instances of the desired plant type are detected at the top of the second-from-left row, or at the end of the second-from-left row no matter what plants are detected. Similarly, in the third-from left row (travelling downward on the page), another ROI $350_3$ is established at detection of another weed 364, and continues until the end of the row because there were no instances of two or more consecutive desired plants. The last row on the right contained only desired plants, and consequently, no ROIs were established there.

Various types of targeted inferences may be generated based on the targeted inference data captured while boom 230 is carried over ROIs $350_{1-3}$. For example, one or more machine learning models trained to identify specific types of weeds may be downloaded, e.g., by edge agricultural inference system 104B from central agricultural inference system 104A, in response to detection of non-desired plants from the triage data. These newly-downloaded machine learning models (e.g., CNNs) may be applied, e.g., by edge inference module 118B, to the targeted inference data obtained while boom 230 is carried through ROIs $350_{1-3}$ to determine which type(s) of weeds were detected. Depending on the type(s) of weeds detected, different remedial actions may be taken, such as applying selected herbicides, manually destroying/pulling weeds, culling whole rows to prevent further spread, and so forth.

Figure 4A:
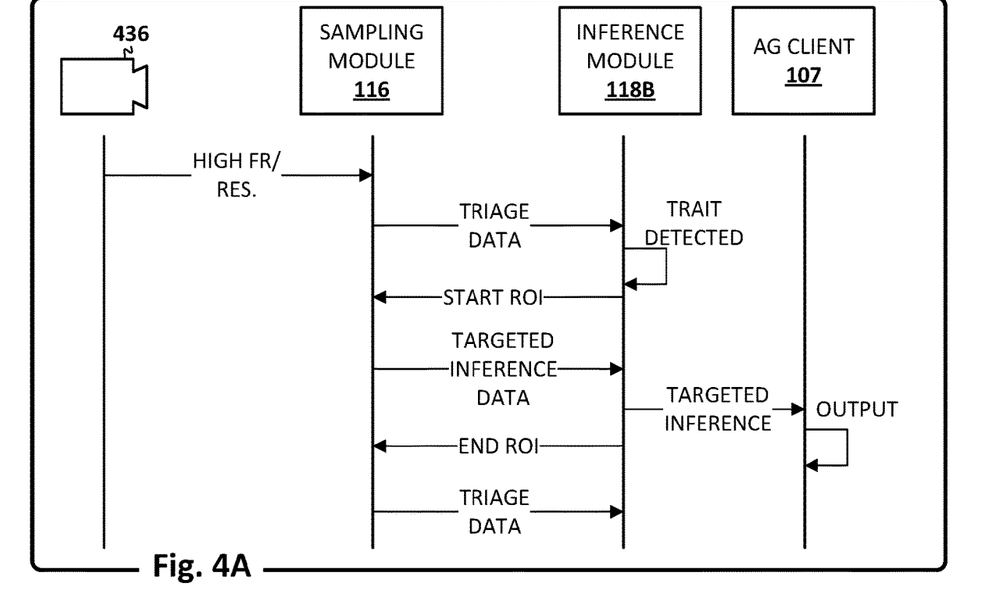
FIGS. 4A and 4B depict an example of how various components described herein may exchange and process data to make both triage and targeted agricultural inferences.
Figure 4B:
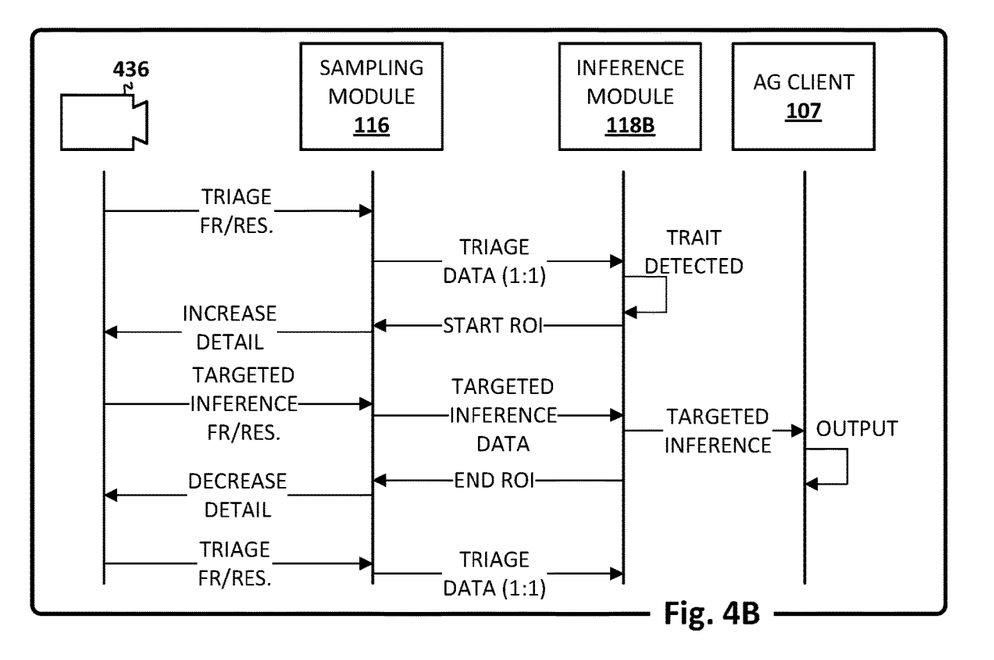

FIGS. 4A and 4B schematically demonstrate two alternatives for how edge agricultural inference system 104B may transition between obtaining and processing triage data to make preliminary/triage inferences, and obtaining/processing targeted inference data to make targeted inferences at a greater level of detail and/or specificity. Both FIGS. 4A and 4B depict a vision sensor 436, sampling module 116, edge inference module 118B, and AG client 107 (installed on a client device 106). Sensors of edge computing nodes $108_3$/234 are not limited to vision sensors, and may include any other type of sensor, such as thermometers, moisture sensors, barometers, pressure sensors, etc.

In FIG. 4A, a vision sensor 436 is operated to capture images at a high frequency and/or resolution. For example, vision sensor 436 may be a 2D RGB camera that is operated natively at 30 FPS, and/or is operated to obtain images at a relatively high spatial/spectral resolution. Edge agricultural inference system 104B may lack sufficient resources to process data at such a high framerate and/or spatial/spectral resolution, especially to detect multiple different plant traits. Accordingly, with implementations described herein, sampling module 116 may sample triage data from the high framerate/resolution stream of vision data generated by vision sensor 436. As mentioned previously, triage data may have a relatively low level of detail (e.g., lower framerate and/or spatial/spectral resolution).

Inference module 118B may process the triage data and, upon detecting one or more targeted plant traits exhibited by one or more plants in the agricultural field, send a command to sampling module 116 to start (or establish, or open) an ROI. Upon receiving that command, sampling module 116 may begin sampling targeted inference data from the high framerate/resolution stream of vision data generated by vision sensor 436. This targeted inference data may have greater detail (e.g., higher framerate and/or spatial/spectral resolution) than the triage data. In some cases the targeted inference data may have the same or similar level of detail as the data generated natively by vision sensor 436.

Upon processing the targeted inference data, inference module 118B may make one or more targeted inferences, data indicative of which may be provided to AG client 107. AG client 107 may in turn generate output that conveys the targeted inference in some fashion. For example, AG client 107 may report the inference directly (e.g., chart(s) showing crop yield predictions, maps showing location(s) of weeds/blight, etc.). Additionally or alternatively, AG client 107 may make recommended changes to agricultural operations (e.g., "increase irrigation by 20%), recommend remedial actions (e.g., eliminating weeds or pests) as applicable, and so forth.

Once the exit condition for the ROI is detected (e.g., no more plants exhibiting a particular trait) by inference module 118B, inference module 118B may send sampling module 116 a command to end the ROI. This may cause sampling module 116 to cease obtaining highly-detailed targeted inference data from vision sensor 436, and go back to sampling less-detailed triage data from vision sensor 436. In various implementations, the highly-detailed vision data generated by vision sensor natively 436 may be provided to, for instance, central agricultural inference system 104A, for more comprehensive, if somewhat delayed, processing and inferences.

FIG. 4B is similar in many respects of FIG. 4A. The biggest difference is how sampling module 116 and vision sensor 436 operate. In FIG. 4B, vision sensor 436 generates vision data as low detail triage data (e.g., low framerate, spatial/spectral resolution) initially. This low-detail triage data generated at vision sensor 436 may be sampled by sampling module 116 at a 1:1 ratio in some implementations and provided to inference module 118B.

Inference module 118B may process the triage data and, upon detecting one or more targeted plant traits exhibited by one or more plants in the agricultural field, send a command to sampling module 116 to start (or establish, or open) an ROI. In response, sampling module 116 may send a command to vision sensor 436 to increase the level of detail at which it captures image data. In response, vision sensor 436 begins sending targeted inference data which, as noted previously, has a greater level of detail (e.g., framerate, spatial and/or spectral resolution) than the triage data.

As was the case in FIG. 4A, in FIG. 4B, inference module 118B obtains and processes this targeted inference data to generate a target inference. Data indicative of this targeted inference is provided, e.g., by inference module 118B, to AG client 107, which once again provides appropriate output. Once inference module 118B determines, e.g., based on continued processing of targeted inference data, that an exit condition has been satisfied, inference module 118B may send a "stop ROI" command to sampling module 116. Sampling module 116 in turn may send a command to vision sensor 436 to decrease the level of detail it generates. Subsequently, vision sensor 436 may generate lower-detail triage data, e.g., until inference module 118B sends another "start ROI" command.

Figure 5:
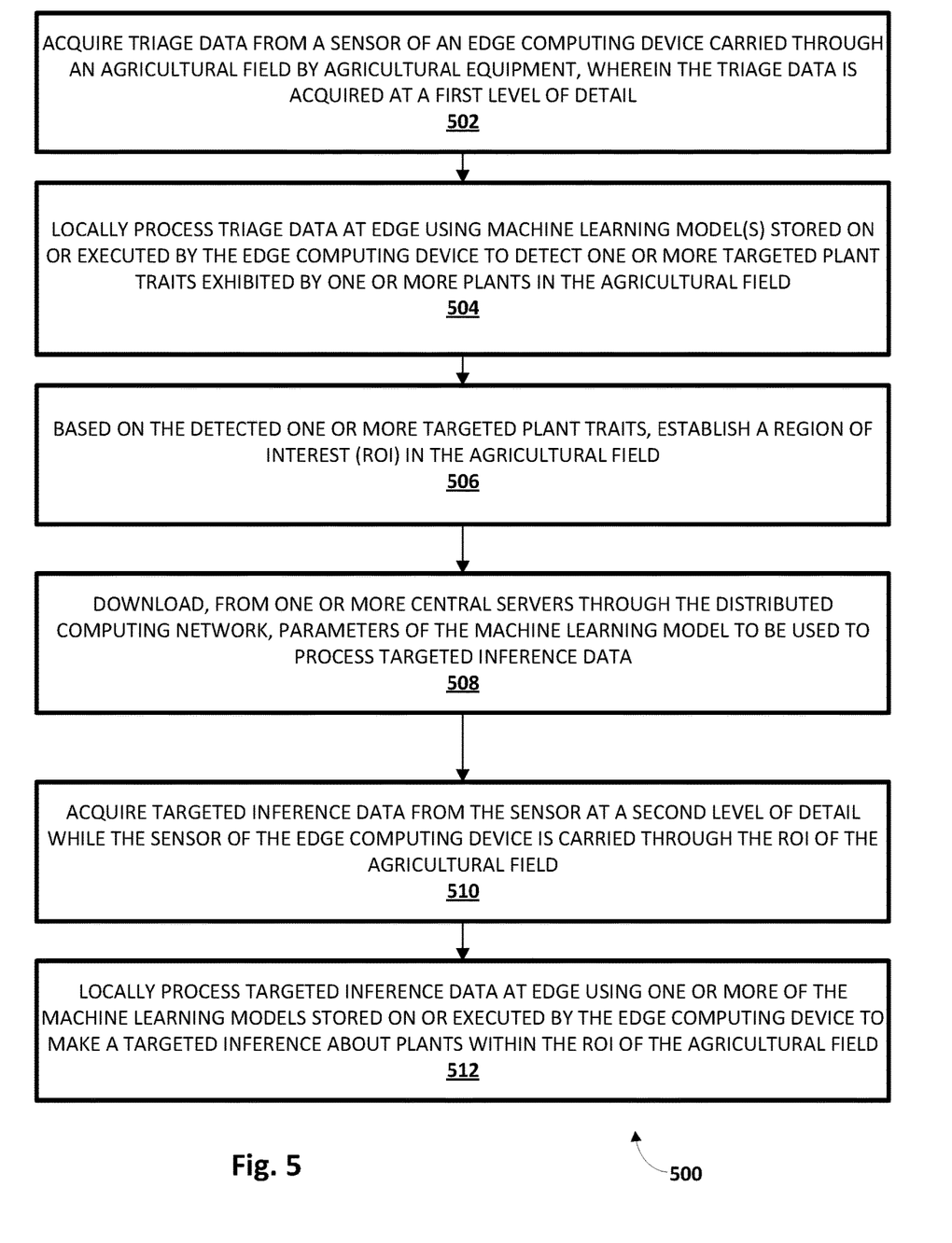
FIG. 5 is a flowchart of an example method in accordance with various implementations described herein.

FIG. 5 illustrates a flowchart of an example method 500 for practicing selected aspects of the present disclosure. Method 500 may be implemented using one or more resource-constrained edge processors (e.g., logic 242 of edge computing node $108_3/234$ that implements edge agricultural inference system 104B) at an edge of a distributed computing network that are remote from one or more central servers (e.g., that implement central agricultural inference system 104A) of the distributed computing network. For convenience, operations of method 500 will be described as being performed by a system configured with selected aspects of the present disclosure. Other implementations may include additional operations than those illustrated in FIG. 5, may perform operation(s) of FIG. 5 in a different order and/or in parallel, and/or may omit one or more of the operations of FIG. 5.

At block 502, the system may acquire triage data from a sensor of an edge computing node (e.g., $108_3$, 234) carried through an agricultural field by agricultural equipment. The triage data may be acquired at a first level of detail that is lower than, for instance, a level of detail of which the sensor is capable. For example, sampling module 116 may sample the triage data as a subset of a data stream generated by the sensor, as demonstrated in FIG. 4A. Alternatively, the sensor may be operated to generate a lower level of detail (until a targeted plant trait is detected), as was illustrated in FIG. 4B.

At block 504, the system may locally (i.e. at the edge site 102) process the triage data at the edge using one or more machine learning models stored on or executed by the edge computing node to detect one or more targeted plant traits exhibited by one or more plants in the agricultural field. For example, one or more edge computing nodes $108_3/234$ may apply image data captured by their vision sensor(s) 236 as input across one or more CNNs to detect presence of various phenotypic attributes and/or other plant traits, such as plant type, presence of plant disease/blight, coloring indicative of ill plant health, presence of pests, fruits/flowers/buds/nuts (e.g., present, at a particular stage of development, at a threshold density), and so forth.

Based on the detected one or more targeted plant traits, at block 506, the system may establish an ROI in the agricultural field, such as the ROIs $350_{1-3}$ depicted in FIG. 3. In FIG. 3, the same edge computing nodes $234_{1-N}$ detected the targeted plant trait(s), established the ROIs $350_{1-3}$, and went on to perform the targeted inference processing. However, this is not meant to be limiting. In some implementations, the establishment of ROIs may be performed by a separate farm equipment entity from the targeted inference processing. For example, a robot such as $108_M$ may traverse along rows of a field, capturing and processing triage data. The robot may establish ROIs based on detecting targeted plant traits, and may flag those ROIs for further consideration based on the robot's own localization capabilities. Another farm equipment entity, such as a another robot, one or more edge computing nodes 234 affixed to other farm equipment (e.g., boom of a tractor), etc., may later traverse through the same fields and may obtain/process higher detail targeted inference data while it passes through the previously-flagged ROIs.

At block 508 (which may be performed before, after, or concurrently with the operations of block 510), the system may download, from one or more central servers through the distributed computing network, parameters of the machine learning model to be used to process targeted inference data. The parameters may be selected from a library of machine learning model parameters (e.g., central database 120A) based on the detected one or more targeted plant traits. For example, if plant disease is potentially detected via leaves having spots, then one or more sets of machine learning model parameters associated with detection of one or more plant diseases that might cause spots may be selectively downloaded, e.g., by edge inference module 118B. If the requisite machine learning models/parameters are already stored at the edge computing node $108_3/234$ that will be performing the targeted inferencing, e.g., in database 120B, then block 508 may be omitted. Alternatively, edge computing node $108_3/234$ may download the parameters from a local server deployed at the edge (which itself may obtain those parameters from database 120A).

At block 510, the system, e.g., by way of sampling module 116, may acquire targeted inference data from the sensor at a second level of detail while the sensor of the edge computing node is carried through the ROI of the agricultural field. As noted previously, the second level of detail may be greater than the first level of detail, e.g., in terms of spatial, spectral, and/or temporal resolution/frequency, and may already be generated by the sensor (FIG. 4A) or the sensor may be transitioned into a high detail state where it generates higher detail data (FIG. 4B).

At block 512, the system, e.g., by way of edge inference module 118B, may locally process the targeted inference data at the edge using one or more of the machine learning models stored on or executed by the edge computing node to make a targeted inference about plants within the ROI of the agricultural field.

Figure 6:
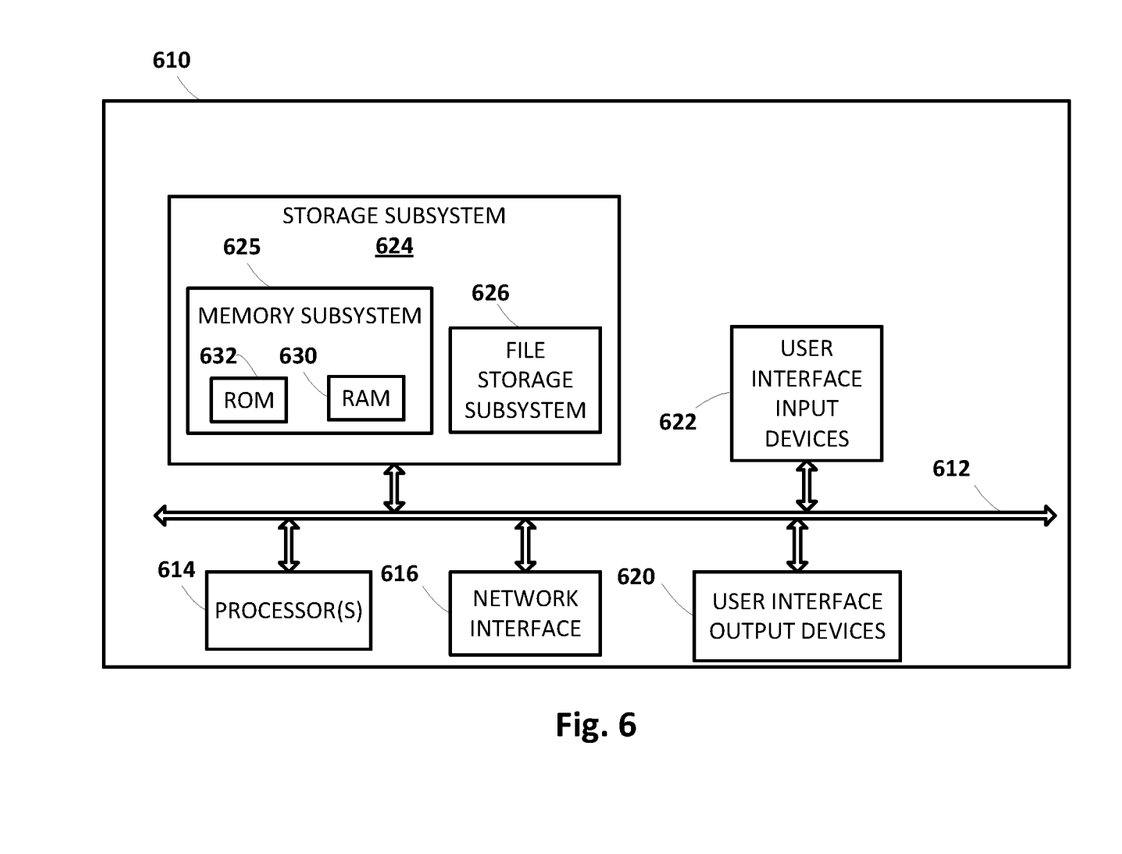
FIG. 6 schematically depicts an example architecture of a computer system.

FIG. 6 is a block diagram of an example computing device 610 that may optionally be utilized to perform one or more aspects of techniques described herein. Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In some implementations in which computing device 610 takes the form of a HMD or smart glasses, a pose of a user's eyes may be tracked for use, e.g., alone or in combination with other stimuli (e.g., blinking, pressing a button, etc.), as user input. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, one or more displays forming part of a HMD, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the method 500 described herein, as well as to implement various components depicted in FIGS. 1, 2, and 4.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more resource-constrained edge processors at an edge of a distributed computing network that are remote from one or more central servers of the distributed computing network, the method comprising:
    acquiring triage data from a sensor of an edge computing node carried through an agricultural field by agricultural equipment, wherein the triage data is acquired at a first level of detail;
    locally processing the triage data at the edge using one or more machine learning models stored on or executed by the edge computing node to detect one or more targeted plant traits exhibited by one or more plants in the agricultural field;
    in response to detection of the one or more targeted plant traits, establishing a region of interest (ROI) in the agricultural field and downloading, from one or more of the central servers through the distributed computing network, parameters of a targeted inference machine learning model, wherein the targeted inference machine learning model is selected from a library of machine learning model parameters based on the detected one or more targeted plant traits;
    acquiring targeted inference data from the sensor at a second level of detail while the sensor of the edge computing node is carried through the ROI of the agricultural field, wherein the second level of detail is greater than the first level of detail; and
    locally processing the targeted inference data at the edge using the targeted inference machine learning model to make a targeted inference about plants within the ROI of the agricultural field.

2. The method of claim 1, wherein the sensor operates at a first frequency, and acquiring the triage data at the first level of detail comprises sampling sensor output of the sensor at a second frequency that is less than the first frequency.

3. The method of claim 1, wherein the sensor comprises a vision sensor, the first level of detail comprises a first framerate, and the second level of detail comprises a second framerate that is greater than the first framerate.

4. The method of claim 1, wherein the sensor comprises a vision sensor, the first level of detail comprises a first resolution, and the second level of detail comprises a second resolution that is greater than the first resolution.

5. The method of claim 1, wherein the same machine learning model is used to process the triage data and the targeted inference data.

6. The method of claim 1, wherein the machine learning model used to process the triage data is a triage machine learning model, the machine learning model used to process the targeted inference data is a targeted inference machine learning model, and processing the triage data using the triage machine learning model utilizes less computing resources than processing the targeted inference data using the targeted inference machine learning model.

7. The method of claim 1, wherein the agricultural equipment comprises an autonomous robot that is equipped with the sensor.

8. The method of claim 1, wherein the agricultural equipment comprises a farming vehicle, and the sensor is mounted on a boom of the farming vehicle.

9. The method of claim 8, wherein the sensor is integral with a modular computing device that is removably mounted on the boom, wherein the modular computing device is equipped with one or more of the edge processors.

10. The method of claim 1, further comprising acquiring additional targeted inference data from an additional sensor at a third level of detail while the additional sensor is carried through the ROI of the agricultural field.

11. The method of claim 1, wherein the detected one or more targeted plant traits comprise one or more of:
  a plant type;
  one or more heights of one or more plants;
  a density of a plurality of plants;
  presence of a plant disease or malady;
  a color of one or more plants;
  presence of one or more fruits or flowers on one or more plants; or
  one or more sizes of one or more fruits or flowers on one or more plants.

12. An edge computing node of a distributed computing network, the edge computing node comprising one or more sensors, one or more processors, and memory storing instructions that, in response to execution of the instructions by the one or more processors, cause the one or more processors to:
  acquire triage data from one or more of the sensors while the edge computing node is carried through an agricultural field by agricultural equipment, wherein the triage data is acquired at a first level of detail;
  locally process the triage data using one or more machine learning models stored on or executed by the edge computing node to detect one or more targeted plant traits exhibited by one or more plants in the agricultural field;
  in response to detection of the based on the detected one or more targeted plant traits, establish a region of interest (ROI) in the agricultural field and download, from one or more of the central servers through the distributed computing network, parameters of a targeted inference machine learning model, wherein the targeted inference machine learning model is selected from a library of machine learning model parameters based on the detected one or more targeted plant traits;
  acquire targeted inference data from the same sensor or a different sensor at a second level of detail while the edge computing node is carried through the ROI of the agricultural field, wherein the second level of detail is greater than the first level of detail; and
  locally processing the targeted inference data using the targeted inference machine learning model to make a targeted inference about plants within the ROI of the agricultural field.

13. The edge computing node of claim 12, wherein the sensor operates at a first frequency, and acquiring the triage data at the first level of detail comprises sampling sensor output of the sensor at a second frequency that is less than the first frequency.

14. The edge computing node of claim 12, wherein the sensor comprises a vision sensor, the first level of detail comprises a first framerate, and the second level of detail comprises a second framerate that is greater than the first framerate.

15. The edge computing node of claim 12, wherein the sensor comprises a vision sensor, the first level of detail comprises a first resolution, and the second level of detail comprises a second resolution that is greater than the first resolution.

16. At least one non-transitory computer-readable medium comprising instructions that, in response to execution of the instructions by one or more resource-constrained edge processors at an edge of a distributed computing network that are remote from one or more central servers of the distributed computing network, cause the one or more processors to perform the following operations:
  acquire triage data from a sensor of an edge computing node carried through an agricultural field by agricultural equipment, wherein the triage data is acquired at a first level of detail;
  locally process the triage data at the edge using one or more machine learning models stored on or executed by the edge computing node to detect one or more targeted plant traits exhibited by one or more plants in the agricultural field;
  in response to detection of the one or more targeted plant traits, establish a region of interest (ROI) in the agricultural field and download, from one or more of the central servers through the distributed computing network, parameters of a targeted inference machine learning model, wherein the targeted inference machine learning model is selected from a library of machine learning model parameters based on the detected one or more targeted plant traits;
  acquire targeted inference data from the sensor at a second level of detail while the sensor of the edge computing node is carried through the ROI of the agricultural field, wherein the second level of detail is greater than the first level of detail; and
  locally process the targeted inference data at the edge using the targeted inference machine learning model to make a targeted inference about plants within the ROI of the agricultural field.

17. The at least one non-transitory computer-readable medium of claim 16, wherein the sensor operates at a first frequency, and acquiring the triage data at the first level of detail comprises sampling sensor output of the sensor at a second frequency that is less than the first frequency.

18. The at least one non-transitory computer-readable medium of claim 16, wherein the sensor comprises a vision sensor, the first level of detail comprises a first framerate, and the second level of detail comprises a second framerate that is greater than the first framerate.

19. An agricultural vehicle comprising one or more sensors, one or more edge processors, and memory storing instructions that, in response to execution of the instructions by the one or more edge processors, cause the one or more edge processors to:
  acquire triage data from one or more of the sensors while the agricultural vehicle travels through an agricultural field, wherein the triage data is acquired at a first level of detail;

locally process the triage data using one or more machine learning models stored on or executed by one or more of the edge processors to detect one or more targeted plant traits exhibited by one or more plants in the agricultural field;

in response to detection of the one or more targeted plant traits, establish a region of interest (ROI) in the agricultural field and download, from one or more of the central servers through the distributed computing network, parameters of a targeted inference machine learning model, wherein the targeted inference machine learning model is selected from a library of machine learning model parameters based on the detected one or more targeted plant traits;

acquire targeted inference data from the same sensor or a different sensor at a second level of detail while the agricultural vehicle travels through the ROI of the agricultural field, wherein the second level of detail is greater than the first level of detail; and locally processing the targeted inference data using the targeted inference machine learning model to make a targeted inference about plants within the ROI of the agricultural field.

20. The agricultural vehicle of claim 19, wherein the agricultural vehicle takes the form of a robot.

21. The agricultural vehicle of claim 19, wherein the agricultural vehicle comprises a tractor equipped with an edge node, wherein the edge node includes one or more of the sensors and one or more of the edge processors.

\* \* \* \* \*